(12) United States Patent
Torobin

(10) Patent No.: US 6,269,513 B1
(45) Date of Patent: Aug. 7, 2001

(54) WIPE PADS WITH SUPERIOR SOLIDS REMOVAL ABILITY USING SUB-MICRON FILAMENTS

(76) Inventor: Leonard B. Torobin, 12555 The Vista, Los Angeles, CA (US) 90049

( * ) Notice: Subject to any disclaimer, the term of this patent is extended or adjusted under 35 U.S.C. 154(b) by 0 days.

(21) Appl. No.: 09/385,237

(22) Filed: Aug. 28, 1999

Related U.S. Application Data

(60) Provisional application No. 60/098,217, filed on Aug. 28, 1998.

(51) Int. Cl.[7] ..................................................... A47L 13/17
(52) U.S. Cl. ........................ 15/104.93; 15/209.1; 442/340
(58) Field of Search ................................ 15/104.93, 208, 15/209.1; 442/340

(56) References Cited

U.S. PATENT DOCUMENTS

| | | | |
|---|---|---|---|
| 4,784,892 | * 11/1988 | Storey et al. | 15/209.1 X |
| 4,888,229 | * 12/1989 | Paley et al. | 15/209.1 X |
| 5,178,932 | * 1/1993 | Perkins et al. | 15/209.1 X |
| 5,229,191 | * 7/1993 | Austin | 15/209.1 X |

FOREIGN PATENT DOCUMENTS

| | | | |
|---|---|---|---|
| 2-23922 | * 1/1990 | (JP) | 15/209.1 |
| 4-96724 | * 3/1992 | (JP) | 15/209.1 |

\* cited by examiner

*Primary Examiner*—Mark Spisich

(57) ABSTRACT

A three dimensional wipe pad with a superior capacity to remove contaminant solids particles from solid surfaces consists of a compressible bed of loose and discontinuous ultra-fine filaments which filaments include a significant number of sub-micron diameter microfilaments, enclosed and sealed in a pouch made from a deformable material which is permeable to the contaminant solids being removed. Rubbing a contaminated surface with the pad causes the contaminant solids to pass into the interior of the wipe where they are trapped in the interstices between the ultra-fine filaments. Liquids may be added to the pad to assist the passage of the contaminant solids particles into the interior of the pad.

11 Claims, 4 Drawing Sheets

Fig. 4

Comparison of incidence of contaminant induced defects ("craters") in finished painted surface of automobiles

| | conventional wipes | wipes of this invention |
|---|---|---|
| 1. cleaning means: | | |
| 2. number of vehicles prepared, (2 wipes per vehicle) | 50 | 50 |
| 3. number of standard craters | 35 | 1 |
| 4. number of shallow craters | 7 | 2 | ded
WIPE PADS WITH SUPERIOR SOLIDS REMOVAL ABILITY USING SUB-MICRON FILAMENTS

CROSS-REFERENCE TO RELATED APPLICATIONS

This application claims the benefit of U.S. provisional application Ser. No. 60/098,217, filed Aug. 28, 1998.

BACKGROUND OF THE INVENTION

Wipes are well known commercial, consumer, and industrial products relied upon to assist in the removal of contaminants from surfaces. They are available in a wide variety of materials fashioned into relatively thin sheets. The earliest wipes were probably woven rags and these were replaced to some degree by thin sheet paper products. Unfortunately, rags and cellulosic paper products tend to shed fiber particles, and to tear, so that they can not be used to decontaminate surfaces to the low particulate levels required by many modern-day manufacturing processes.

Improved wipes followed the development of processes to produce filaments from synthetic polymeric materials such as the "meltblowing" process as described in U.S. Pat. No. 3,978,185 to Bunting et al. dated Aug. 31, 1976. This led to the substitution of such synthetic filaments for the cellulosic filaments by compressing and bonding the filaments into sheets, for example as given in U.S. Pat. No. 4,307,143 to Meitner, dated Dec. 22, 1981. Although these products had improved strength, and a reduced tendency to shed filaments, they were still relatively weak. Since the fibers were bonded and permanently compressed, they had a diminished interstitial volumes and therefor diminished abilities to absorb liquids. Modest absorption improvements resulted from creating patterned indentations in the sheet of polymer filaments as exemplified in U.S. Pat. No. D0,409,389 to May et. al., dated May 11, 1999.

The foregoing wipes all suffered from an inability to remove substantial amounts of solids contaminants because they could do so only by the attachment of the contaminant solids to the surface of the wipe, since the act of compressing and bonding of the filaments tended to create a fiber web which restricted the passage of solids contaminants into the interior of the wipe. Also, since these wipe products were in the form of thin two dimensional sheets, they had very little interior volume. Furthermore, since the filaments of the wipes were in a restrained and bonded state, particles which did find their way into the interstices of the fiber webs were not readily trapped could pass back out again, particularly if the wipes were used moistened or otherwise wetted with a carrier or solvent liquid.

Many laminate fabric species have been proposed during the last several decades in which sheets of meltblown filaments are compressed and bonded to external layers of substantially continuous non-woven "spunbonded" filaments. A recent example is given in U.S. Pat. No. 5,804,512 to Lickfield et. al. dated Sep. 8, 1998. These have increased strength, but the meltblown filaments are bonded, compressed, and restricted, and therefore have a limited ability to capture particles irreversibly and to absorb liquids. Also, these laminates tend to be stiff and therefore do not have the flexibility or "drape" required for a wipe to conform readily to the surface being decontaminated. Reduced conformation results in a corresponding reduction in wiping efficiency with an increased possibility that some sections of the surface being cleaned would be bypassed under the conditions which would reasonably occur in manufacturing operations.

The liquid absorptive capacities of the wipes described above could be enhanced by increasing their thickness. However, this would result in unacceptably high levels of stiffness.

Recent advances in manufacturing and processing technologies, and environmental concerns, have created a demand for more stringent levels of cleanliness. This has produced a corresponding need for economical wipe products that can provide increased capacities to remove contaminant solids, and to absorb cleaning liquids, coincident with low wipe fiber shedding, high wipe strength, and minimum wipe stiffness.

SUMMARY OF THE INVENTION

The invention resides in a wipe constituted from a compressible bed of loose and discontinuous ultra-fine filaments which filaments include a significant number of sub-micron diameter filaments. Methods for making suitable micro filaments, including sub-micron diameter microfilaments, are described in U.S. Pat. No. 4,363,464 to Torobin dated Dec. 14, 1982, U.S. Pat. No. 4,525,314 to Torobin dated Jun. 25, 1985, and U.S Pat. No. 4,536,361 to Torobin dated Aug. 20, 1985. On a commercial basis, suitable micro filaments are available from Nanofiber Technology Incorporated, Aberdeen, N.C.

The ultra-fine microfilaments are contained and sealed in a pouch made from a deformable porous material which is permeable to the contaminant solids particles being removed. The contaminant solids particles are removed by rubbing the solids-contaminated surface being cleaned with the wipe, employing a rubbing pressure sufficient to cause the contaminant solids to pass through the apertures in the permeable surface and to contact the bed containing the ultra-fine filaments. The rubbing pressure causes the particles to be forced further into the interior of the bed of loose ultra-fine microfilaments where the particles are trapped, in part due to the attractive contact forces on the surface of the ultra-fine microfilaments and mechanical entanglement. The solids are thereby prevented from passing back out through the solids-permeable walls of the pouch. Also, the apertures of the pouch material are selected to be sufficiently small to prevent the leakage of significant amounts loose ultra-fine microfilaments to the exterior of the pouch. Such leakage could result in "linting" which would contaminate the surface being cleaned.

The strength and particle shedding requirements for the wipe are addressed by proper selection of the pouch material only. The selection of the internal ultra-fine microfilaments is then freed to focus on the liquid and solids absorption performance required by the wipe user. This invention therefor provides a unique ability to uncouple the physical property considerations, allowing each element to be optimized to a level previously unattainable.

The passage of the contaminant solids through the wall of the wipe may be facilitated by the use of a lubricating solids-transporting liquid which is selected to be a non-solvent for the particular contaminant solids particles being removed and non-solvent for the pouch material or the interior loose ultra-fine microfilaments. Appropriate solids-transporting liquids include those with relatively high vapor pressures which eventually evaporate and do not remain on the originally solids-contaminated surface after the solids are removed by the wipe. To augment the surface forces capturing the contaminant solids in the ultra-fine microfilaments, the transporting fluid may be selected to have a positive wetting contact angle with respect to the contaminating solids and to the material constituting the loose ultra-fine filaments.

The use of loose super-fine filaments including sub-micron filaments promotes the rapid and uniform distribution of the solids transporting liquid throughout the wipe.

Excessive movement of some or all of the loose ultra-fine microfilaments contained in the pouch can be minimized by establishing occasional point attachments of opposite walls of the pouch by conventional means such as heated point bonding or ultrasonic point bonding.

The pouch used to contain the loose fine filaments may be made of any flexible fabric or membranous material which contains openings sufficiently large to allow the passage of the contaminant solids but sufficiently small to prevent the leakage of significant quantities of the contained ultra-fine microfilaments. Accordingly, it may be fabricated from woven or non woven essentially continuous filaments which have sufficient strength not to break or otherwise become detached during the rubbing action described above. The filaments constituting the fabric employed as the walls of the pouch may be from fiber forming organic compounds such as the thermoplastic or thermosetting polymer resins. Alternatively, they may be made from inorganic fiber forming materials including ceramic, glass, or metal compositions.

Also, the walls of the pouch may be made from membrane films containing holes which are large enough to pass the contaminant particles, yet small enough to prevent loose ultra-fine microfilaments from leaking from the pouch during the rubbing action.

In some instances, the solids transporting liquid may be sufficiently volatile and flammable so as to constitute a potential for ignition due to charge generation during the rubbing action. Fine metal filaments may be added to the loose ultra-fine microfilaments in the interior of the pouch to provide a charge collecting means, and the pouch can be grounded externally by connection of the metallic filaments or metalized plastic filaments to a grounding conductor. Alternatively, metal filaments or metalized plastic filaments can be incorporated in the fabric employed as the pouch material, or the fabric surface on the inside of the pouch may be metalized by conventional vapor or chemical deposition means.

A variety of shapes and relative dimensions of the pouch used to encapsulate the ultra-fine filaments may be employed. Accordingly, the length, width, and depth dimensions of the pouch may be equal. Where it is desirable to decrease the path length of movement of the captured contaminant solids into the interior, the depth dimension may be reduced to be less than one tenth the dimension of the length or width of the pouch.

A portion of the surface of the pouch may be made of a liquid impermeable material to reduce user contact with any liquid contained in the wipe. Also, an auxiliary surface may be added to the so as to form a mitt to facilitate use.

BRIEF DESCRIPTION OF THE DRAWINGS

FIG. 4 is a table summary of the paint defects which occurred in an automobile assembly line, when the wipe of this invention was used for surface decontamination prior to painting. Also shown are the defects which were obtained using conventional wipes.

DETAILED DESCRIPTION OF THE DRAWINGS

Figure 1:
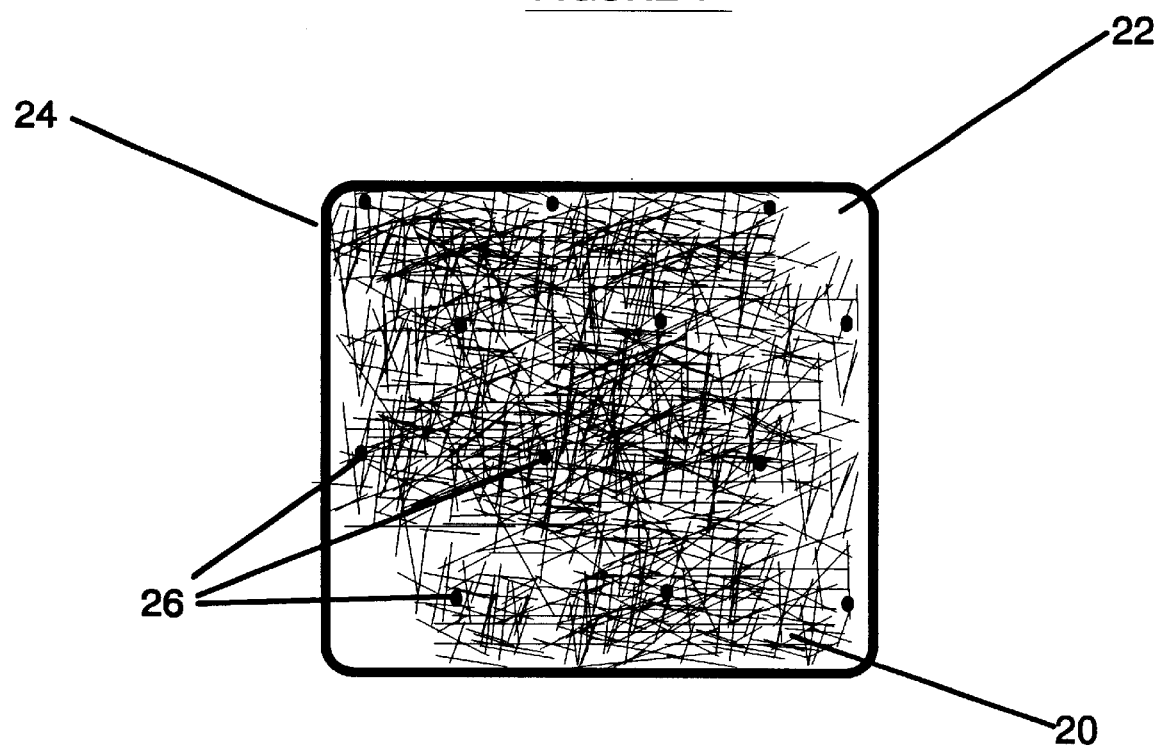
FIG. 1 is a schematic drawing showing a wipe consisting of loose ultra-fine filaments encased in a sealed flexible porous pouch.

FIG. 1 is a schematic drawing of the wipe which constitutes a preferred embodiment of this invention. It is made up, in part, of a bed of loose ultra-fine discontinuous polypropylene filaments 20 approximately 80 percent of which have diameters which are sub-micron. The weight of the bed of filaments is approximately 7 grams. The filaments were obtained from Nanofiber Technology Incorporated located in Aberdeen, N.C. The loose ultra-fine microfilaments are contained in a porous pouch 22.

The pouch is made from two rectangular sheets of polypropylene "spunbonded" fabric each sheet having a dimension of 9 inches by 9 inches. The fabric used to make the sheets has a basis weight of 0.9 ounces per square yard and is supplied by the P.G.I. company of Morresville N.C. The spunbonded fabric, as supplied, is constituted from relatively large diameter monofilaments which are partially heat bonded to each other by callendering under high pressure. The openings between the filaments varies randomly from the barely visible up to approximately $\frac{1}{32}$ inch.

The bed of filaments is located between the spunbonded sheets whose edges are matched up. The pouch is completed by ultrasonically sealing the edges to each other along their full length. The resulting seal 24 is continuous along the perimeter of the joined edges. The thickness of the seal is kept to a minimum to avoid hard edges so as not to scratch the surfaces being decontaminated by the wipe. Occasional point bonds 26 between the two spunbonded surfaces of the pouch 22 are employed to prevent excessive movement of the loose bed of fibers 20 within the wipe.

Figure 2:
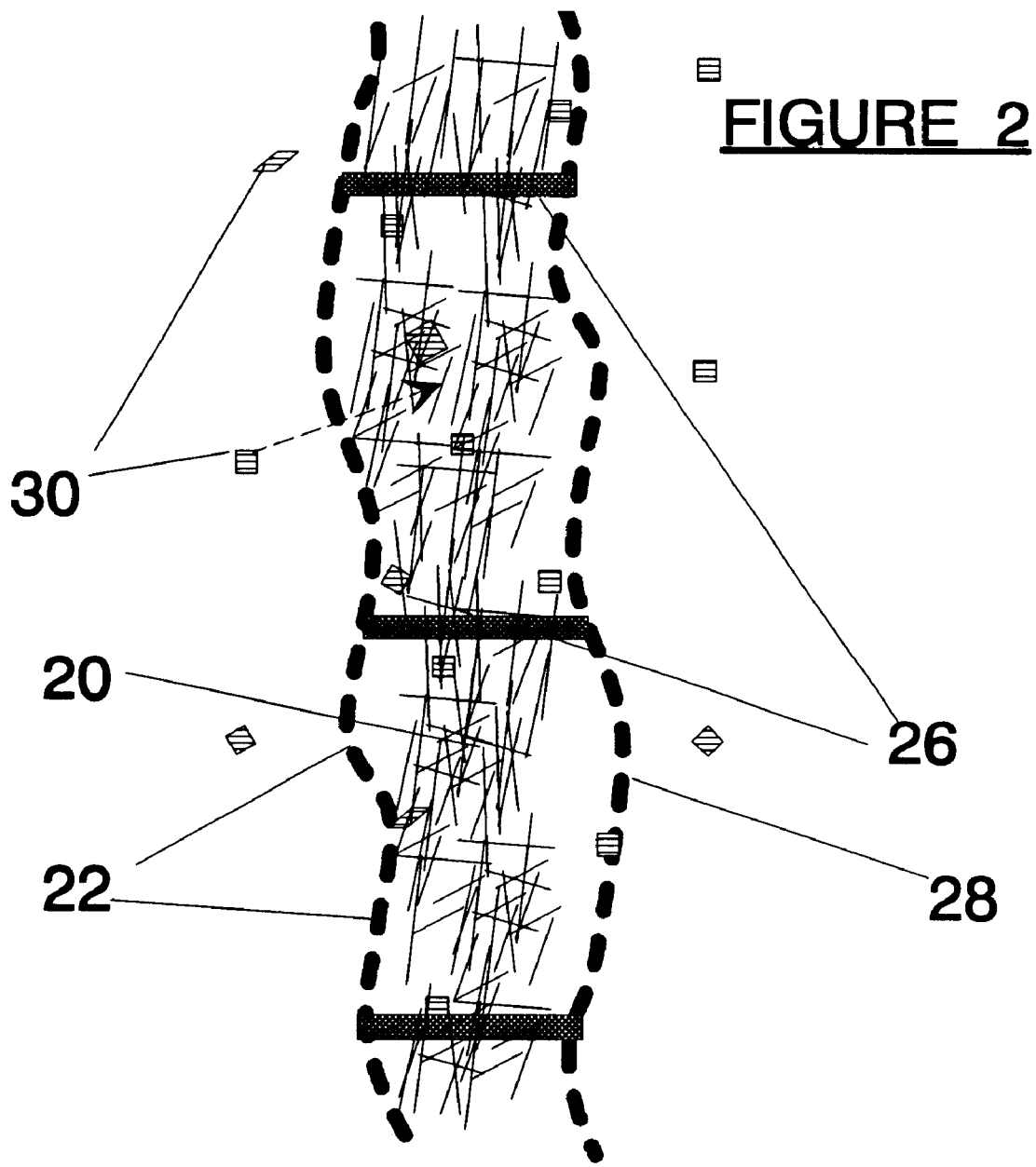
FIG. 2 is a schematic drawing showing an enlarged detailed cross-section of the wipe shown in FIG. 1.

FIG. 2 is a depiction of a magnified cross section of the pouch. The walls of the pouch contain openings 28 by virtue if the spacings between the continuous spunbond fibers already referred to. Contaminant particles 30 are shown in the region exterior to the pouch. The bed of loose ultra-fine filaments 20 are trapped and sealed in the interior cavity of the pouch. Also shown are the occasional point bondings 26 used to reduce the migration of the loose ultra-fine microfilaments in the interior. The point bondings were made by applying ultrasonic energy to cause a localized fusion of opposite walls of the pouch to each other.

Figure 3:
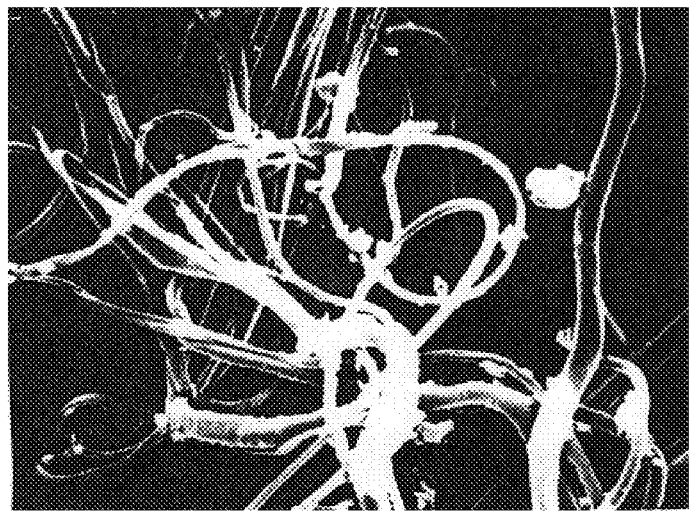
FIG. 3 is an electron microscope photograph at a magnification of approximately 4000 fold showing solids trapped in the sub-micron filaments of the wipe shown in FIG. 1.

FIG. 3 is an electron microscope photograph of the wipe internal sub-micron filaments at a magnification of approximately 4000 fold. The photograph indicates sub-micron dirt particles retained by the filaments.

FIG. 4 is a summary of automobile production data comparing the performance of the wipe of this invention with those currently employed by this manufacturer. The preferred embodiment of the wipe employed was as described in FIGS. 1–3, except that 30 ml. of a transport assisting liquid was added to each wipe. The liquid consisted of an 85% isopropyl alcohol 15% water solution.

The solution was added to the surface of the wipe prior to its use and it was rapidly absorbed by the strong capillary forces caused by the relatively high surface area of the bed of loose ultra-fine microfilaments. The production plant workers noted that packages stacks of the subject wipes of this invention displayed uniform solution concentrations and there was no free liquid in the packages. This was not the case with the conventional wipes. Even though they contained only 25 ml. of solution per wipe, there was often free liquid in their packages which would cause the conventional wipe to drip, an event which can lead to paint defects due to excessive wetness of the surfaces being painted.

The comparative data shown in FIG. 4 were obtained during regular assembly line operations by the regular work force. A total of 100 vehicles were involved in this particular test. More recently, similar results have been obtained in plant operations over extended periods of time, and this wipe has been selected for standard operations on the basis of its superior performance relative to the current state of the art wipes. The results summarized in FIG. 4 suggest a clear superiority in reducing contaminant levels as is inferred from the striking reduction in the paint defects referred to as "craters".

Although the comparative tests involved an equal number of wipes per vehicle, more recent continuous plant experience showed an ability to reduce the wipe use by approximately 50% with a potential for a similar reduction in the environmental contaminating VOCs.

In a second preferred embodiment of this invention, a knitted polyester fabric having a basis weight of 2.5 oz./sq. yd is substituted for the spunbonded fabric used in the previous example. The fabric is supplied by Pitman Knits Incorporated, Vale, N.C. Also, the amount of liquid added to the wipe is increased to 50 ml.

It will be appreciated that the foregoing examples, shown for purposes of illustration, are not to be construed as limiting the scope of the invention.

I claim:

1. A three dimensional wipe pad for the removal of contaminants from solid surfaces which comprises a compressible bed of ultra-fine microfilaments, said microfilaments being loose and discontinuous and substantially unbonded and including a significant quantity of unbonded sub-micron diameter microfilaments, said bed being enclosed and contained in a sealed pouch made from a deformable sheet material which material is permeable to the contaminants being removed.

2. The wipe pad of claim 1 wherein a majority of the microfilaments employed are of sub-micron diameter.

3. The wipe pad of claim 2 wherein the bed of microfilaments contains a liquid.

4. The wipe pad of claim 3 wherein the deformable sheet material consists of a knitted fabric.

5. The wipe pad of claim 3 wherein the deformable sheet material consists of a spunbond fabric.

6. The wipe pad of claim 3 wherein the bed of microfilaments has a dry weight of from 100 to 900 grams per square meter of the major cross-sectional area of the pad.

7. The wipe pad of claim 3 wherein the bed of microfilaments has dry a weight of from 175 to 600 grams per square meter of the major cross-sectional area of the pad.

8. The wipe pad of claim 4 wherein the bed of microfilaments contains from 500 to 4500 ml of liquid per square meter of the major cross-sectional area of the pad.

9. The wipe pad of claim 4 wherein the bed of microfilaments contains from 700 to 1500 ml of liquid per square meter of the major cross-sectional area of the pad.

10. The wipe pad of claim 5 wherein the bed of microfilaments contains from 500 to 4500 ml of liquid per square meter of the major cross-sectional area of the pad.

11. The wipe pad of claim 5 wherein the bed of microfilaments contains from 700 to 1500 ml of liquid per square meter of the major cross-sectional area of the pad.

* * * * *